US012008328B1

(12) United States Patent
Derza (10) Patent No.: US 12,008,328 B1
(45) Date of Patent: *Jun. 11, 2024

(54) INTELLIGENT AUTOMATED ORDER-BASED CUSTOMER DIALOGUE SYSTEM

(71) Applicant: WALGREEN CO., Deerfield, IL (US)

(72) Inventor: Oliver Derza, Willowbrook, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,049

(22) Filed: Apr. 14, 2023

Related U.S. Application Data

(63) Continuation of application No. 17/156,236, filed on Jan. 22, 2021, now Pat. No. 11,694,039.

(51) Int. Cl.
| | |
|---|---|
| *G10L 15/22* | (2006.01) |
| *G06F 40/35* | (2020.01) |
| *G10L 15/18* | (2013.01) |
| *G06F 3/16* | (2006.01) |

(52) U.S. Cl.
CPC .......... *G06F 40/35* (2020.01); *G10L 15/1815* (2013.01); *G10L 15/22* (2013.01); *G06F 3/167* (2013.01); *G10L 2015/225* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 10,762,113 B2 * | 9/2020 | Jia | G10L 15/193 |
| 10,970,727 B2 | 4/2021 | Bucknell et al. | |
| 11,004,444 B2 | 5/2021 | Johnson, Jr. | |
| 11,023,959 B2 | 6/2021 | Kalaimani | |
| 11,042,834 B2 | 6/2021 | Pike et al. | |
| 11,069,354 B2 | 7/2021 | Burris et al. | |

(Continued)

OTHER PUBLICATIONS

Instacart, "Help Center". Retrieved from the Internet at: <URL:www.instacart.com/help> accessed on Nov. 30, 2020 (2020).

*Primary Examiner* — Richard Z Zhu
(74) *Attorney, Agent, or Firm* — MARSHALL, GERSTEIN & BORUN LLP; Randall G. Rueth (57) ABSTRACT

Based on a detection that a customer has arrived at an enterprise location to pick up a previously-placed order, an intelligent automated customer dialogue system generates an interface via which an intelligent customer dialogue application dialogues with the customer. The application generates and initially offers, at the interface using natural language, content which is contextual to one or more items of the order, e.g., by using a specially trained intelligent dialogue machine learning model. The application may intelligently respond to the customer's natural language responses and/or requests to refine, augment, or redirect subsequently-offered content and/or dialogue, e.g., by using the model. Offered content (e.g., product information, services, coupons, suggestions, recommendations, etc.) generally provides value-add to the customer as well as maintains customer engagement. The system may be implemented at least partially by using a chatbot upon curbside pick-up, for example, as well as through other electronic customer facing channels.

20 Claims, 3 Drawing Sheets

(56) References Cited

U.S. PATENT DOCUMENTS

| | | |
|---|---|---|
| 11,132,740 B2 | 9/2021 | Buckholdt et al. |
| 11,238,859 B2 | 2/2022 | Burris et al. |
| 11,257,492 B2 | 2/2022 | Chang |
| 11,710,169 B2 * | 7/2023 | Bradley ............. G06Q 30/0631 705/26.7 |
| 11,756,105 B2 * | 9/2023 | Luk ...................... H04L 51/046 705/26.82 |
| 2002/0169618 A1 | 11/2002 | Caspari |
| 2005/0125229 A1 | 6/2005 | Kurzweil |
| 2014/0067395 A1 | 3/2014 | Balasubramanian et al. |
| 2015/0026092 A1 * | 1/2015 | Abboud ............. G06Q 30/0281 705/346 |
| 2015/0179170 A1 | 6/2015 | Sarikaya et al. |
| 2018/0090141 A1 | 3/2018 | Periorellis et al. |
| 2018/0285752 A1 | 10/2018 | Yu et al. |
| 2019/0027142 A1 | 1/2019 | Iwanami |
| 2019/0056726 A1 | 2/2019 | Weldemariam et al. |
| 2019/0138330 A1 | 5/2019 | Wu |
| 2019/0236205 A1 | 8/2019 | Jia et al. |
| 2020/0380969 A1 | 12/2020 | Burris et al. |
| 2020/0410994 A1 | 12/2020 | Burris et al. |
| 2022/0148034 A1 * | 5/2022 | Min ................... G06Q 30/0267 |

* cited by examiner

INTELLIGENT AUTOMATED ORDER-BASED CUSTOMER DIALOGUE SYSTEM

CROSS-REFERENCE TO RELATED APPLICATIONS

This application is a continuation of U.S. patent application Ser. No. 17/156,236 entitled "Intelligent Automated Order-Based Customer Dialogue System" and filed on Jan. 22, 2021, the disclosure of which is hereby incorporated by reference herein in its entirety.

TECHNICAL FIELD

This application generally relates to an intelligent automated order-based customer dialogue system which initiates intelligent dialogue with a customer after a customer has arrived at an enterprise location to pick-up a previously-placed order.

BACKGROUND

Typically, when a customer arrives at a location of an enterprise to pick up a previously-placed order, e.g., via curbside pickup, the customer electronically notifies the enterprise of the customer's arrival, for example, by activating a user control on an enterprise application executing on the customer's personal electronic device (PED) or by activating a user control included in an email from the enterprise. Subsequently, the customer waits for the order to be delivered to the customer's vehicle. In most situations, the only electronic interaction between the customer and the enterprise during the customer's wait (if any at all) consists of updates on the order's fulfillment status provided by the enterprise and delivered to the customer's PED. Some enterprises provide a phone number for the customer to call if the customer has questions during the wait.

SUMMARY

In an embodiment, a method for automatically initiating an intelligent dialogue with a customer of an enterprise based on the arrival of the customer at an enterprise location to pick up an order that the customer has placed includes receiving, by a computing system of an enterprise, an electronic signal indicative of an arrival of a customer at a location of the enterprise to pick up an order. The method additionally includes, in response to receiving the electronic signal, generating, by the enterprise computing system at a user interface of a customer-facing computing device located at the enterprise location, a dialogue interface via which the customer and an intelligent customer dialogue application dialogue or converse using natural language; determining, by the intelligent customer dialogue application, an initial question pertaining to a context of a particular item of the order; and posing, by the intelligent customer dialogue application, the initial question at the dialogue interface using natural language.

In an embodiment, a computing system of an enterprise includes one or more processors; one or more tangible memories storing an order placed by the customer with the enterprise and information included in an account of a customer with the enterprise; and one or more communication interfaces via which the computing system obtains an electronic signal indicative of an arrival of the customer at a location of the enterprise to pick up the order. Additionally, the computing system includes an intelligent customer dialogue application stored on the one or more memories and executable by the one or more processors to, in response to the received electronic signal: generate, at a user interface of a customer-facing computing device located at the enterprise location, a dialogue interface enabling the intelligent customer dialogue application and the customer to dialogue using natural language; determine an initial question pertaining to a context of a particular item of the order; and pose the initial question at the dialogue interface using natural language.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Figure 1:
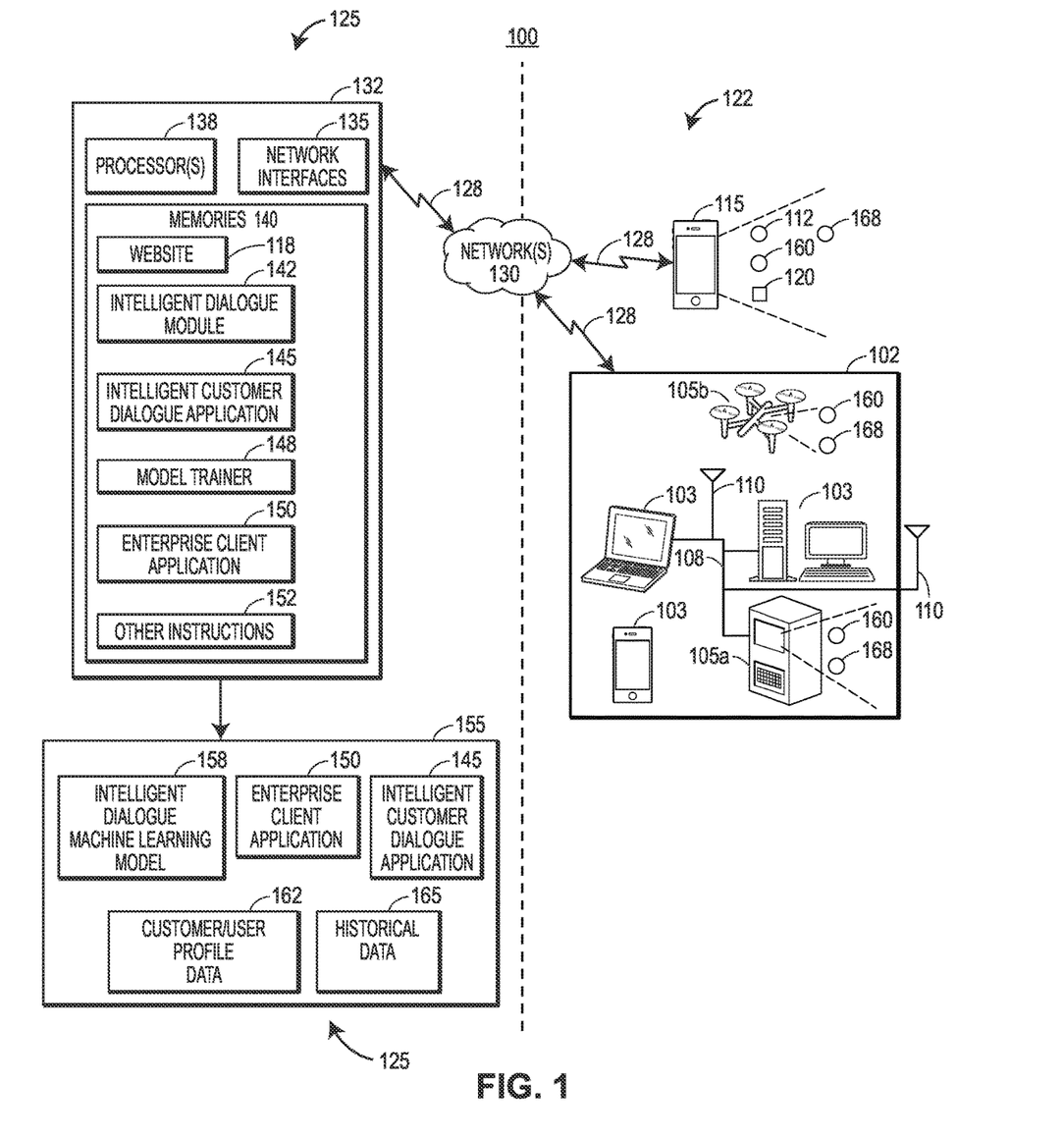
FIG. 1 depicts a block diagram of an example system of an enterprise which includes an intelligent customer dialogue system, in accordance with the principles and techniques described herein.

FIG. 1 illustrates an embodiment of a system 100 which includes an example intelligent automated order-based customer dialogue system. The system 100 may be a machine learning (ML) system, in an embodiment.

The system 100 may include a combination of hardware, firmware, and software components, as well as various data communication channels for communicating data between and among the various hardware, firmware, and software components. The system 100 may be owned and/or operated by an enterprise or organization, such as a pharmacy or other type other type of retailer. Generally, but not necessarily, the enterprise may include one or more physical storefronts or physical locations 102 at which one or more local or front-end computing devices 103, 105*a*, 105*b* of the enterprise are disposed. Examples of physical storefronts of the enterprise may include brick-and-mortar stores, retail operations hosted within other buildings (such as hospitals, university buildings, shopping malls, airports, etc.), pop-up stores or locations, designated pick-up and/or distribution locations, and the like, each of which may have a respective mailing (e.g., postal) address. The one or more local or front-end computing devices 103, 105*a*, 105*b* may include one or more enterprise-facing computing devices 103 which are used and/or operated by employees or agents of the enterprise. Examples of enterprise-facing computing devices 103 may include local servers that service their respective physical storefront location, computing devices (which may be stationary or mobile computing devices) which are individually operated by employees and/or agents of the enterprise (such as pharmacists, register personnel, stocking personnel, order fulfillment personnel, retail floor staff, etc.), and/or other types of enterprise-facing computing devices. The one or more local or front-end computing devices 103, 105*a*, 105*b* may include one or more customer-facing computing devices 105*a* which are fixedly disposed at their respective physical storefront and are available for customer use, such as kiosks, information booths, self-checkout computing devices, price scanners, and the like. Additionally or alternatively, the one or more local or front-end computing devices 103, 105*a*, 105*b* may include one or more customer-facing computing devices 105*b* which are mobile computing devices, such as drones, robots, etc., which may or may not be operated by enterprise personnel, and which may or may not be at least partially autonomously-mobile. The front-end computing devices 103, 105*a*, 105*b* of a particular storefront location 102 may be communicatively connected via a local network 108, e.g., via respective wired and/or wireless communication interfaces. Other components at the particular location 102 such as wired and/or wireless sensors and/or other types of detecting electronic devices 110 may also communicatively connect to the local network 108, e.g., via respective wired and/or wireless communication interfaces. For example, the sensors and/or other types of detecting electronic devices 110 may include heat sensors, movement sensors, cameras, audio devices, wireless transceivers, and the like. At least some of the sensors and/or other types of detecting electronic devices 110 may be stationary and/or fixedly disposed at the location 102. Additionally or alternatively, at least some of the sensors and/or other types of detecting electronic devices 110 may be mobile sensors or devices which move into, out of, and around the location 102 to perform sensing functions, such as drones, robots, etc.

The enterprise may include one or more electronic storefronts or electronic storefront locations, such as instances 112 of client applications which are provided by the enterprise and which execute at various user personal electronic devices (PEDs) 115, and/or a website 118 that is accessible to the user personal electronic devices 115 (e.g., via one or more web browsers 120 executing on the customer PEDs 115). Each of the instances 112 of the client applications and of the website 118 accessed via the various web browsers 120 may have one or more respective electronic addresses (such as a website address, an IP address, etc.). For example, a user of a PED 115 may access and navigate the enterprise website 118 via a browser 120 executing at the PED 115, and/or via an instance 112 of an enterprise-provided client application which has been downloaded to and is executing on the PED 115.

The personal electronic device or PED 115 operated by the user may be, for example, a personal computer, a cellular phone, a smart device, a mobile communications device, a tablet, a laptop, another type of handheld electronic device, a desktop computer, etc. For ease of discussion, the PED 115 is referred to interchangeably herein as a "mobile device 115," a "client device 115," or simply "a device 115;" however, the techniques discussed herein are equally applicable to any type of PED 115 operated by a user irrespective of whether or not the PED 115 is mobile or stationary. It is noted that, in some implementations, an enterprise may choose to apply the systems, methods, and techniques described herein to only certain types of PEDs 115 (e.g., to only mobile PEDs and not stationary PEDs; only to only smart devices and smart phones but not tablets or laptops, etc.). However, these types of implementations are at the discretion of the enterprise as, generally speaking, the systems, methods, and techniques disclosed herein are equally applicable to any type of PED 115.

The local computing devices 103, 105*a*, 105*b* of the system 100, the website 118 accessed via browsers 120 at the PEDs 115, and the instances 112 of enterprise client applications executing at PEDs 115 are collectively referred to herein as "front-end components 122" of the system 100. The system 100 may also include a set of back-end components 125, as depicted in FIG. 1. Communicative connections or links 128 between the front-end components 122 and the back-end components 125 may be established through one or more digital data and/or communications networks 130. The digital network(s) 130 may include a proprietary network, a secure public Internet, a virtual private network, and/or some other type of network, such as dedicated access lines, plain ordinary telephone lines, satellite links, wireless links, wired links, combinations of these, etc. Where the digital network 130 comprises the Internet or other IP-based communication network, data communication may take place over the digital network 130 via a protocol of the Internet protocol suite (e.g., TCP/IP, UDP, SCTP, various application layer protocols, etc.). Generally speaking, the communicative connections or links 128 which are established between the front-end components 122 and the back-end components 125 may be implemented by using any known communication technique, such as by establishing sessions therebetween, tunneling, circuit-switching, virtual circuit switching, etc.

The back-end components 125 of the system 100 may include one or more servers or computing devices 132, which are interchangeably referred to herein as "the back-end servers 132," "the back-end computing devices 132," or the "back-end server system 132." The one or more back-end computing devices 132 may be implemented, for example, by a bank of servers, a cloud computing system, one or more networked computing devices, or any other suitable arrangement of one or more computing devices. The back-end computing devices 132 may include one or more network interfaces 135 that communicatively connect the back-end computing devices 132 to the network(s) 130, the local computing devices 103, 105*a*, 105*b* associated with the physical storefronts 102, and the PEDs 115. Additionally, the back-end computing devices 132 may include one or more processors 138 and one or more tangible, non-transitory memories 140 on which the website 118 and the other programs, applications, instructions, and/or routines 142-152 pertaining to the enterprise are stored. For example, the one or more memories 140 may store an intelligent dialogue module or component 142, an intelligent customer dialogue application 145, a model training module or component 148, an enterprise client application 150, and/or other modules, components, programs, applications, etc. 152, each of which comprises respective computer-executable instructions that are executable by the one or more processors 138. For example, at least one device of the back-end computing devices 132 may store instructions 152 for hosting the website 118 of the enterprise. In some embodiments, the one or more memories 140 may store an enterprise client application 150, instances 112 of which may be downloaded into various user PEDs 115 for execution thereon.

Additionally, the back-end computing devices 132 may include and/or may be communicatively connected to one or more data stores 155, where the one or more data stores 155 comprise one or more tangible, non-transitory data storage devices which are particularly adapted to store data related to the operations of the system 100. It should be appreciated that although the data stores 155 are shown in FIG. 1 as a single data storage entity, the data stores 155 may be implemented using one or more databases and/or one or more data storage devices. For example, the data stores 155 may be implemented by a data bank or a data cloud. It should be noted that, while not shown, additional databases and/or data stores may be linked to the one or more back-end servers 132 in a known manner.

As shown in FIG. 1, the data stores 155 store an intelligent dialogue machine learning model 158, which may be utilized by the system 100 to initiate, generate, and maintain contextual, customized, or personalized dialogues with individual users or customers, e.g., in a manner such as described in more detail elsewhere within this disclosure. In some implementations, the data stores 155 may store the enterprise client application 150, of which instances 112 may be downloaded into various user PEDs 115 for execution thereon. Additionally or alternatively, the data stores 155 may store the intelligent customer dialogue application 145, of which instances 160 may be downloaded into various user PEDs 115 and/or into various customer-facing front-end computing devices 105a, 105b at and/or associated with various physical storefront locations 102.

Further, the data stores 155 may store customer or user profile data 162. The customer or user profile data 162 may include a plurality of profiles of a plurality of users associated with the enterprise, e.g., customers, clients, registered users, etc. Each user profile may be associated with a particular individual user or customer, and may be uniquely identified within the system 100 by a respective enterprise user identifier. For example, an enterprise user identifier may comprise a set of alphanumeric and/or other types of characters that are assigned by the enterprise to uniquely identify a particular user to the enterprise, whether at the website or in other databases and/or locations operated by the enterprise. Each user profile may store data corresponding to its respective user, such as his or her login credentials (e.g., user login name, password, passphrase, passcode, answers to security questions, biometric data, etc.), contact information (e.g., address, phone numbers, email addresses, etc.), account information, user preferences, purchase history, return history, stored payment options, prescriptions that have been ordered and filled, rewards and/or loyalty account data, information indicative of transactions between the respective user and the enterprise, information indicative of contact between the customer and the enterprise and the substance of the contact (e.g., interactions that have taken place via the enterprise website 118, via instances 112 of the enterprise application 150, via in-person visits to storefront locations 102, via phone call, via email, via chat, etc.), and/or other types of information related to the customer and the enterprise. Importantly, a user's profile stores a record of orders which have been placed via the user's account, the contents (e.g., items) included in each order, and the respective statuses of the orders, e.g., filling in progress, filled and awaiting pickup, filled and picked-up, filled and shipped, canceled, other stages of order fulfillment, etc. In some instances, a user's profile may store an indication of any subsequent customer activities corresponding to an order. A "subsequent" customer activity, as generally utilized herein, refers to an activity which a customer initiates with the enterprise after the order has been placed and which, in most situations, relates to the order, e.g., item return, customer email or chat inquiring about an item in the order or a related item phone call about an item in the order, the order itself as a whole, a related item, etc. Subsequent customer-initiated activities may occur via electronic communication channels (e.g., email, chat, etc.), via phone, and/or in-person.

Still further, the data stores 155 may store historical data 165 related to the enterprise. The historical data 165 may include historical data indicative of various aspects and/or characteristics of a plurality of orders placed by a plurality of customers with the enterprise, items included in the orders, subsequent customer activities related to the orders and/or to the items in the orders (e.g., interactions of customers with the enterprise via various contact and/or communication channels) at various stages of order fulfillment and after orders have been filled and/or picked up, enterprise activities related to the orders and/or to the items in the orders at various stages of order fulfillment, locations (e.g., physical or electronic) at which orders were placed, physical locations at which orders were picked up, among other types of historical data. For example, the historical data may also include indications of customer preferences, customer history of subsequent activities related to specific ordered items, seasonality (e.g., holidays, back-to-school, month of the year, etc.), customer demographics, weather conditions, other external events or conditions (e.g., major sporting events in the vicinity of the location, convention or conference activity in the vicinity of the location, proximity of location to office buildings or schools, etc.), to name a few.

The back-end computing devices or servers 132 may access the data stored in the data stores 155 when executing various functions and tasks associated with the operation of the system 100. For example, the intelligent dialogue module 142 and/or an intelligent customer dialogue application 145 at the back-end servers 132 may access the intelligent dialogue machine learning model 158 and the user profile data 162 to initiate and maintain an intelligent dialogue with a customer via a dialogue interface 168, e.g., in manners such as described elsewhere within this disclosure. The back-end servers 132 may maintain and update various data stored in the data stores 155. For example, the back-end servers 132 may receive customer orders, route orders to fulfillment locations, update passwords, user preferences, and default payment methods for various users within the user profile data 160, etc. (e.g., as indicated by various front-end components 122), and/or the intelligent dialogue module 142 and optionally other instructions 148 at the back-end servers 132 may update the historical data 165 to include data indicative of various intelligent customer dialogues which have been initiated, generated and/or maintained by the system 100 (e.g., as indicated by various front-end components 122). In another example, the intelligent dialogue module 142 and optionally other instructions 148 at back-end servers 132 may create and/or update the intelligent dialogue machine learning model 158, e.g., by utilizing the historical data 165, the customer profile data 162, and/or updates thereto, as is discussed in more detail elsewhere within this disclosure.

As previously mentioned, the one or more memories 140 of the back-end servers 132 may contain or be configured with machine- or computer-readable or computer-executable instructions or modules (e.g., software) 142-152 for execution by the one or more processors 132. For example, the sets of instructions 142-152 may be implemented as programs, applications, instructions, services, modules, routines, and the like, which may be executed by the one or more processors 132 to perform various tasks associated with initiating, generating, and maintaining intelligent dialogue with customers, generating and updating the intelligent dialogue machine learning model 158, as well as to perform various tasks associated with operation of the enterprise. In an embodiment, some of the instructions 142-152 may comprise respective sets of computer-executable instructions which, when executed by the processor 132, cause the system 100 to execute at least a portion of embodiments of any of the methods described herein, such as the method 200 and/or the method 300. In some implementations, one or more of the sets of instructions 142-152 may operate in conjunction with one or more front-end components 122 (e.g., in conjunction with instances 112 of the client application 150, browsers 120 via which the website 118 is accessed, instances 160 of the intelligent customer dialogue application 145, etc.) to perform various tasks associated with initiating, generating, and maintaining intelligent dialogue with customers, to perform at least portions of one or more of the methods described herein, and/or to perform various tasks associated with the operations of the enterprise.

Generally speaking, and as is described in more detail elsewhere within this disclosure, the intelligent dialogue module 142 may manage and administer intelligent customer dialogues and applications, data, tasks, and actions associated therewith across the system 100, e.g., at various customer PEDs 115 and/or at various local, customer-facing computing devices 105a, 105b. For example, the intelligent dialogue module 142 may cause instances 160 of the intelligent dialogue application 145 to be respectively downloaded into various local, customer-facing computing devices 105a, 105b and/or into various customer PEDs 115 (e.g., as part of or in conjunction with instances 112 of enterprise client applications 150 which are downloaded into the various customer PEDs 115). Additionally, the intelligent dialogue module 142 may instruct various instances 160 of intelligent dialogue applications 145 of relevant detected information and/or may instruct various instances 160 of the intelligent dialogue application 145 to perform various tasks and/or actions associated with intelligent customer dialogues (e.g., generate a dialogue interface, close the dialogue interface, update local application instances, etc.). The intelligent dialogue module 142 may also access the intelligent dialogue machine learning model 158 on behalf of various instances 160 of the intelligent customer dialogue application 145, in some situations. Further, the intelligent dialogue module 142 may interface, on behalf of intelligent dialogue components (e.g., various instances 160 of the intelligent customer dialogue application 145, the intelligent dialogue machine learning model 158, etc.) with other portions of the system 100, such as the website 118, instances 112 of enterprise client applications 150, user profiles 162, and the like. Still further, the intelligent dialogue module 142 may initiate the generation, training, and updating of the intelligent dialogue machine learning model 158, e.g., via the model trainer 148 and by utilizing historical enterprise data 165 and/or customer profile data 162.

Generally, and as is described in more detail elsewhere within this disclosure, the intelligent customer dialogue application 145 or instances 160 thereof may manage individual intelligent customer dialogues. For example, an instance 160 of an intelligent customer dialogue application 145 which has been downloaded into a local customer-facing computing device 105a, 105b or into a customer's PED 115 may manage intelligent customer dialogues at the device into which the intelligent customer dialogue application 145 has been downloaded. In some implementations, the intelligent customer dialogue 145 at the back-end servers 132 may manage multiple intelligent customer dialogues at multiple local devices 105a, 105b and/or customer PEDs 115. For example, the intelligent customer dialogue 145 may be implemented at the back-end servers 132 as a web service via which various instances 160 of intelligent customer dialogue applications 145 executing at the local devices 105a, 105b and/or at the customer PEDs 115 may utilize to perform intelligent dialogue with customers. In some implementations, the intelligent customer dialogue application 145/160, the dialogue interface 168, and optionally the intelligent dialogue module 142 may be implemented using a chatbot or other suitable natural language dialogue technique.

Still further, it will be appreciated that although only one computing device 132 is depicted in FIG. 1 as being included in the back-end components 125, multiple computing devices 132 may be provided for the purpose of distributing server load, serving different web pages, implementing different portions of an electronic web interface, servicing different enterprise client applications, servicing different intelligent dialogue applications, etc.

Figure 2:
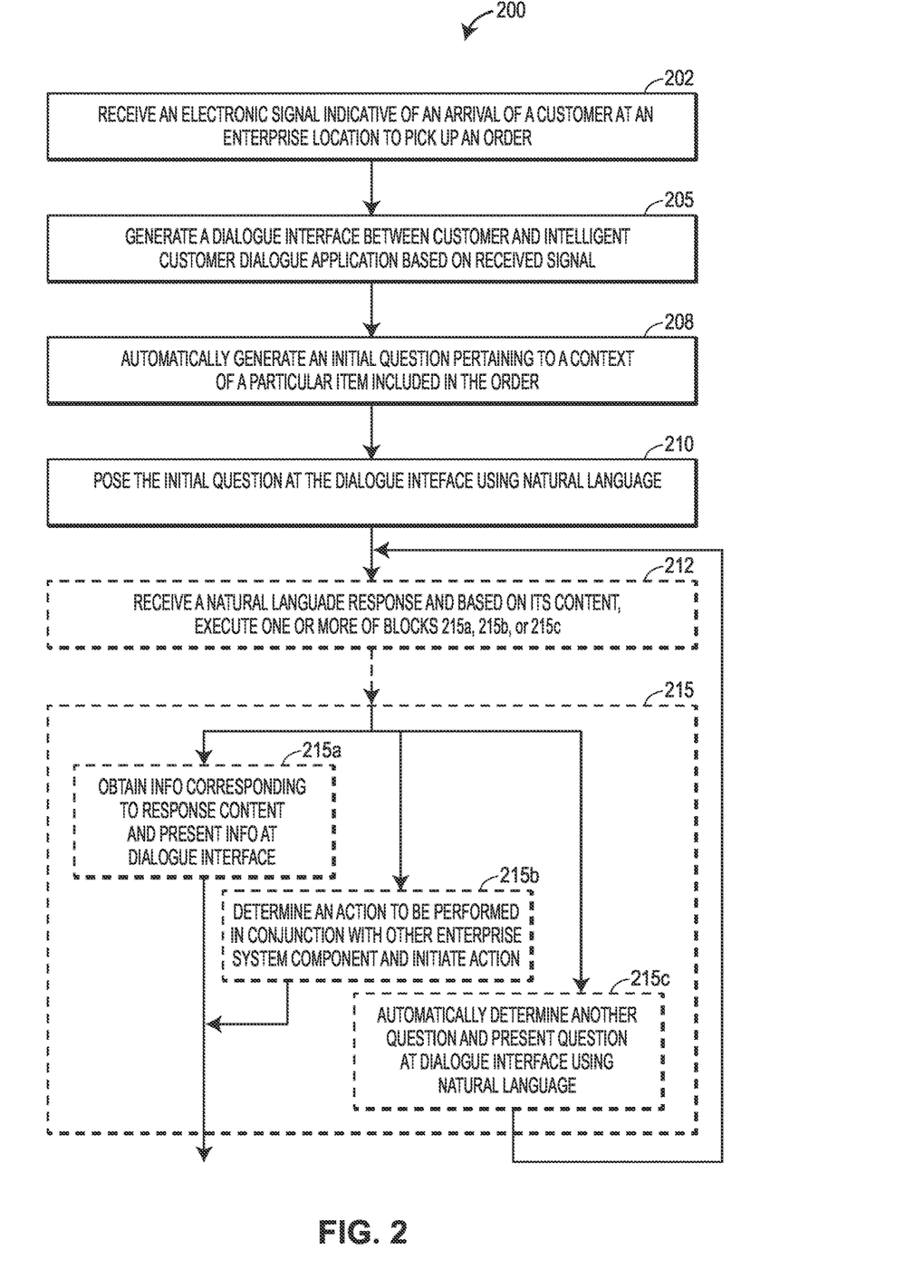
FIG. 2 depicts a flow chart of an example method for automatically initiating an intelligent dialogue with a customer of an enterprise based on the arrival of the customer at an enterprise location to pick up an order that the customer has placed.

FIG. 2 depicts a flow chart of an example method 200 for automatically initiating an intelligent dialogue with a customer of the enterprise based on the arrival of the customer at an enterprise location to pick up an order that the customer has placed (e.g., via curbside pickup or curbside delivery). The method 200 may operate in conjunction with embodiments of at least a portion of the system 100 of FIG. 1 and any one or more components and/or devices related thereto (such as, for example, the back-end components 125, the local components 103, 105a, 105b, 110 disposed at the enterprise location 102, the network(s) 130, the PEDs 115, etc.), and/or with other systems, processors, databases and/or devices. For example, one or more of the back-end system components 125 and/or one or more components of the front-end system components 122 may execute an instance of the method 200, either individually or jointly. For ease of discussion, though, and not for limitation purposes, the method 200 is discussed with simultaneous reference to FIG. 1. Further, the method 200 may include additional or alternate steps other than those described with respect to FIG. 2, in some embodiments.

At a block 202, the method 200 may include receiving, by a computing system of the enterprise, an electronic signal indicative of an arrival of a customer at a location of the enterprise to pick up an order which was previously placed. In an embodiment, the computing system 100 may receive the electronic signal indicative of the arrival of the customer at the physical location 102 of the enterprise, e.g., a storefront, a designated pick-up location, etc. For example, one or more local computing devices 103, 105a, 105b associated with the physical location 102 of the enterprise and/or one or more sensors 110 disposed at the location 102 may receive an electronic signal indicative of the customer's arrival at the location 102.

In some scenarios, receiving the electronic signal indicative of the arrival of the customer at the location of the enterprise (block 202) may include receiving an electronic signal indicating that the presence of the customer at the physical enterprise location 102 has been detected by one or more computing devices and/or sensors. In some scenarios, one or more sensors, cameras, and/or other types of detecting devices 110 disposed at the physical location 102 may detect the physical presence and/or the identity of the customer at the location 102, and may generate and transmit an electronic signal indicative of the detected customer presence and/or identity to the intelligent dialogue module 142 at the back-end computing device(s) 132 and/or to the intelligent customer dialogue application 145 (e.g., the intelligent customer dialogue application 145 executing at the back-end computing device(s) 132 or a local instance 160 thereof, which are generally referred to herein as the "intelligent customer dialogue application 145/160" for ease of reading). For example, a camera which is attached to a corner of the storefront building 102 or which is attached to a mobile drone or robot surveilling the location 102 may transmit an electronic signal indicative of the detected customer presence.

In some scenarios, a customer-facing computing device 105a, 105b disposed at the physical enterprise location 102 may receive an electronic signal indicative of input which was entered by the customer via a user interface of the device 105a, 105b (e.g., via touchscreen, keyboard, microphone, etc.), and consequently may generate (and optionally transmit, e.g., to the intelligent dialogue module 142 and/or to the intelligent customer dialogue application 145/160) an electronic signal indicating that the customer's presence and identity at the location 102 has been detected.

In some scenarios, one or more sensors and/or wireless transceivers 110 disposed at the physical storefront 102 may detect one or more electronic (e.g., wireless) transmissions generated by the PED 115 of the customer, and accordingly the one or more sensors and/or wireless transceivers 110 may transmit, e.g., to the intelligent dialogue module 142 and/or to the intelligent customer dialogue application 145/160, an electronic signal indicating that the customer's presence and identity at the location 102 has been detected. For instance, an enterprise client application instance 112 executing at the customer's PED 115 or the enterprise website 118 accessed via a browser 120 executing at the customer's PED 115 may transmit a wireless electronic signal indicative of the executing state of the client application instance 112/website 118 (e.g., a heartbeat or broadcast signal) which may be detected by the sensors and/or wireless transceivers 110. Additionally or alternatively, an enterprise client application instance 112 executing at the PED 115 may transmit, e.g., to the intelligent dialogue module 142 and/or to the intelligent customer dialogue application 145/160, a wireless electronic signal indicative of the arrival of the customer at the enterprise location (block 202) upon the customer performing a click, a swipe, or another type of activation of an "I am here" user control or similar provided by the enterprise client application instance 112. Similarly, the customer may activate a user control in an email from the enterprise and/or on the enterprise website 118 to indicate that the customer has arrived at the location 102, and the website 118 or other enterprise application 152 receiving the indication of the activation may transmit an electronic signal indicating the arrival of the customer, e.g., to the intelligent dialogue module 142 and/or to the intelligent customer dialogue application 145/160.

At any rate, in response to receiving the electronic signal(s) indicative of the customer's arrival at the enterprise location 102 (block 202), the method 200 may include generating, at a user interface of a customer-facing computing device 105a, 105b located at the enterprise location 102, a dialogue interface 168 via which the customer and the intelligent customer dialogue application 145/160 may dialogue or communicate using natural language (block 205). For example, the intelligent dialogue module 142 or the intelligent customer dialogue application 145/160 may cause the dialogue interface 168 to be generated at a customer-facing local computing device 105a, 105b disposed at the location 102 or at a customer PED 115. In an example scenario, when an instance 112 of the client application 150 is executing at the customer PED 115, the intelligent customer dialogue module 142 may instruct the client application instance 112 to generate the dialogue interface 168 at the PED 115. In another example scenario, when an instance 160 of an intelligent customer dialogue application 145 has been downloaded into the customer PED 115 (e.g., as part of or in conjunction with the client application instance 112) or has been downloaded into the customer-facing local computing device 105a, 105b, the instance 160 may generate the dialogue interface 168 upon being notified of the customer's arrival at the location 102. Of course, other embodiments of various components of the system 100 may cause the dialogue interface 168 to be generated at the customer-facing local computing device 105a, 105b or at the customer PED 115.

Generally, the dialogue interface (e.g., the dialogue interface 168) includes one or more user interfaces which may be implemented, for example, at least by a pop-up window, a chat box, a portion of a display screen, etc. The dialogue interface 168 may support visual and/or auditory natural language dialogue between the intelligent customer dialogue application 145/160 and the customer. For example, the dialogue interface 168 may include a screen via which text natural language may be presented by the dialogue application 145/160 and/or entered by the customer, and/or may include a microphone and speaker via which auditory natural language may be presented by the dialogue application 145/160 and/or entered by the customer. In some implementations, the dialogue interface 168 may support video. The generated dialogue interface 168 may be communicatively connected to the intelligent customer dialogue application 145 (e.g., at the back-end computing devices 132, or a local instance 160 of the intelligent customer dialogue application 145 at the resident device 105a, 105b, 115. Generally, the intelligent customer dialogue application 145/160 may automatically initiate a dialogue with the customer on behalf of the enterprise via the dialogue interface 168, and may automatically respond to answers and questions provided by the customer via the dialogue interface 168 (and in some cases, may respond in conjunction with the intelligent dialogue module 142).

Indeed, the method 200 may further include determining, by the intelligent customer dialogue application 145/160, an initial question pertaining to a context of a particular item of the order of the customer (block 208), and posing, by the intelligent customer dialogue application 145/160, the initial question at the dialogue interface using natural language (block 210), e.g., in at least one of a visual format or an auditory format. The order and the items included in the order may be stored in association with the customer profile 162, for example, and the intelligent customer dialogue application 145/160 may access the customer profile 162 to obtain information regarding the order and the items included in the order. The initial question pertaining to the context of a particular item may include an offer to provide additional information about or related to the particular item, where the additional information includes information other than information indicative of a fulfillment status of the particular item and/or of the order. That is, the additional information excludes any information indicating a status of the fulfillment of the order or indicating a stage of the fulfillment of the order; and instead is more broadly contextual to the particular item and, in some cases, not related to the specific order at all. For example, if the particular item is a beauty product, the initial question posed by the intelligent customer dialogue application 145/160 at the dialogue interface 168 may ask if the customer would like to see a video on how to use the beauty product, see a list of its ingredients, and/or speak with a beauty consultant about the beauty product. In another example, if the particular item is a household cleaner, the initial question posed by the intelligent customer dialogue application 145 at the dialogue interface 168 may ask if the customer would like to see a video on various uses of the cleaner, see a list of ingredients of the household cleaner, be notified of any cautions associated with the cleaner (e.g., poisonous if ingested, don't use with bleach, etc.), and/or the like. In yet another example, if the particular item is a filled prescription medication or an over-the-counter drug, the initial question may ask if the customer would like to read an article on the efficacy of medication/drug or speak with a pharmacist or pharmacy technician regarding the medication/drug and/or its use.

As such, determining the initial question pertaining to a context of a particular item of the order (block 208) may include selecting the particular item from the set of items included in the order and determining the initial question pertaining to the context of the selected item. In an embodiment, selecting the particular item and determining the initial question pertaining to the context of the selected item includes applying, by the intelligent customer dialogue application 145/160, a machine learning model (e.g., the intelligent dialogue machine learning model 158) to the set of items included in the customer's order to thereby generate an output indicative of one or more selected products and related subsequent customer activities related to the selected product(s). The machine learning model 158 may have been trained based on a machine analysis of enterprise historical data (e.g., historical data 165) indicative of a plurality of orders which have been placed by a plurality of customers for pickup, items included in the plurality of orders, and subsequent customer activities related to the orders and/or ordered items to determine an item of the customer's order which has a higher degree of association to occurrences of subsequent customer activities as compared to other items in the customer's order, and to determine one or more subsequent customer activities that have respective higher degrees of association to the determined ordered item as compared to other subsequent customer activities. That is, by applying the trained machine learning model to the items included in the order of the customer, the trained machine learning model determines or predicts the one or more particular items of the order which are the mostly likely, among the set of items of the order, to have an occurrence of a subsequent customer activity related to the one or more particular items, and the trained machine leaning model also determines or predicts the mostly likely type and content of subsequent customer activit(ies) for the one or more particular items. Subsequent customer activities related to an ordered item may include various types of customer-initiated actions and/or questions related to the ordered item and the content and/or substance of the actions/questions. For example, a subsequent customer activity related to a prescription may include the customer calling the enterprise to speak to a pharmacist about usage, drug interactions with over-the-counter medications, whether or not the medication should be taken with food, etc. In another example, a subsequent customer activity related to a toy may include an email from the customer to the enterprise asking to purchase a warranty or asking for assembly instructions. In another example, a subsequent customer activity related to a beauty product may include clicking on a how-to video provided by the enterprise website 118 or a search for related beauty products by the same manufacturer via an instance 112 of the client application 150. Of course, other types and contents of subsequent customer activities related to ordered items are possible.

Based on the output of the intelligent dialogue machine learning model 158 (e.g., based on the determined item(s) of the customer's order and the determined subsequent customer activit(ies)), the intelligent customer dialogue application 145/160 may determine or formulate the initial question (block 208). For example, when the customer's order includes a beauty product, school supplies, and an over-the-counter (OTC) drug, the trained machine learning model 158 may determine that the OTC drug is the particular item among all items included in the order which is mostly likely to have a subsequent customer activity, and the substance of the most likely subsequent customer activity related to the OTC drug is an inquiry as to whether or not to take the OTC drug with food. Thus, in this example, the intelligent customer dialogue application 145/160 may formulate and pose, at the dialogue interface 168, the initial question "Would you like instructions on how to take the OTC drug included in your order?"

It is noted that the trained intelligent dialogue machine learning model 158 may be trained to determine or select, based on the specific combination of items included in the customer's order, only one item (e.g., a single item) of the order based on which to formulate and pose the initial question, or more than one item of the order based on which to formulate and pose the initial question. For example, if another customer's pickup order includes a filled new prescription for medication X, a filled new prescription for medication Y, the OTC drug of the previous example, a toothbrush, and a gallon of milk, the trained machine learning model 158 may determine, based on the combination of items included in this order, that the items most likely to have a subsequent customer activity are the prescription medications X and Y (rather than the OTC drug, as in the previous example), and the most likely subsequent customer activities are questions about side effects of the medications X and Y. As such, in this example, the intelligent customer dialogue application 145 may formulate and pose, at the dialogue interface 168, the initial question "Would you like me to connect you to a pharmacist to discuss potential side effects of the prescription medications X and Y included in your order?"

In some embodiments, the intelligent dialogue machine learning model 158 may be trained to determine the selected item(s) and related subsequent customer activit(ies) further based on characteristics associated with the plurality of historical customer orders in addition to the combination of items of the order. The additional characteristics may include, for example, a status or stage of fulfillment of the order, customer preferences, customer history of subsequent customer activities related to specific items which were ordered (and optionally picked up), seasonality (e.g., holidays, back-to-school, month of the year, etc.), customer demographics, physical location of the pickup, weather conditions, other external events or conditions (e.g., major sporting events in the vicinity of the location, convention or conference activity in the vicinity of the location, proximity of location to office buildings or schools, etc.), to name a few. In these embodiments, the intelligent customer dialogue application 145/160 may apply the intelligent dialogue machine learning model 158 to the order (e.g., to the specific combination of items included in the order) as well as to indications of one or more other characteristics to determine the specific item or items of the order and subsequent customer activit(ies) to thereby formulate and pose the initial question to the customer at the dialogue interface 168 (blocks 208, 210). The intelligent customer dialogue application 145/160 may obtain some of the additional characteristics (such as customer preferences and demographics) from the customer profile 162, for example. The intelligent customer dialogue application 145 may query other components of the system 100 to obtain other characteristics, such as weather conditions, external events or conditions, time of day/month/date/season, etc.

In some embodiments of the method 200, the method 200 may further include receiving a response to the initial question (block 212). For example, the customer may respond, by using natural language (e.g., by using voice and/or text input at the dialogue interface 168), to the initial question posed by the intelligent customer dialogue application 145/160. The intelligent customer dialogue application 145/160 processes the response of the customer, and generates a contextual reply to the customer response (block 215). The customer response may be a contextual answer to the posed initial question, an instruction or information related to the order, a question that is not related to the order at all, but instead refers to other products, enterprise information, location information, etc.

For example, in some scenarios, the received response of the customer (block 212) may request the system 100 to provide discrete information for consumption by the customer at the dialogue interface 168 and, as such, replying to the response includes obtaining and providing/presenting the requested information at the dialogue interface 168 (block 215a). For example, if the received customer response (block 212) indicates that the customer would like to view a video, read an article, see promotions which are specific to the location 102, view the customer's account history, get directions to parking spots designated for order pick up at the location, etc., the intelligent customer dialogue application 145/160 obtains the information requested by the customer (e.g., from the back-end servers 132) and presents the requested information at the dialogue interface 168 (block 215a).

In other scenarios, the received customer response (block 212) indicates that the customer would like the system 100 to perform an action which requires the participation of other components of the system 100. Consequently, the intelligent customer dialogue application 145/160 may initiate the requested action (block 215b) with the other components. For example, if the received customer response (block 212) indicates that the customer would like to provide an instruction to the order fulfillment agent, the intelligent customer dialogue application 145/160 may transmit an indication of the instruction to a suitable computing device operated by an agent of the enterprise who is related to the fulfillment of the order, e.g., "I need to leave for the moment but will be back around 5:30 to pick up my order" or "Please pack the frozen foods in a separate bag." In another example, if the received response of the customer indicates that the customer would like to converse (e.g., via chat or voice) with an agent of the enterprise (for example, a health or beauty consultant, a pharmacist or pharmacy technician, an account manager, a person associated with fulfilling the order, etc.), the intelligent customer dialogue application 145/160 may establish a communicative connection (e.g., via the local network 108, and optionally via the network(s) 130) with a suitable front-end computing device operated by an agent (e.g., device 103) or with a back-end computing device operated by an agent (e.g., device 132). In a sense, in this example, the intelligent customer dialogue application 145/160 may transfer the communicative connection with the customer at the dialogue interface 168 from being serviced by the intelligent customer dialogue application 145/160 to being serviced by the requested agent via the respective computing device operated by the agent. Alternatively, the intelligent customer dialogue application 145/160 may establish a three-way communicative connection between the customer at the dialogue interface 168, the intelligent customer dialogue application 145/160, and the respective computing device operated by the enterprise agent.

Still, in some situations, the intelligent customer dialogue application 145/160 may initiate the establishment of a communication channel between the device operated by the enterprise agent and another customer-facing device other than the customer-facing device providing the dialogue interface 168. For example, if the intelligent dialogue application 145/160 is communicating with the customer via a dialog interface 168 of a local, front-end computing device 105a, 105b, the intelligent customer dialogue application 145/160 may cause a communication channel to be established between the customer's PED 115 and an enterprise agent's mobile device, e.g., by providing a notification at the agent's mobile device instructing the agent to contact the customer via the customer's PED 115.

In another example of the system 100 initiating an action which requires the participation of other components of the system 100 (block 215b), the intelligent customer dialogue application 145/160 may request another enterprise application (e.g., an instance 112 of the enterprise client application 150, the website 118, or other applications 152) to perform the requested action. For example, if the received customer response (block 212) indicates that the customer would like to update his or her account information or user profile 162, the intelligent customer dialogue application 145/160 may interface with an account management application 152 to allow the customer to do so via the dialogue interface 168. In another example, if the received customer response (block 212) indicates that the customer would like to browse products (related to the order or otherwise), the intelligent customer dialogue application 145/160 may interface with the website 118 or an instance 112 of the enterprise application 150 to provide a search or browsing function via the dialogue interface 168.

In still other scenarios, upon receiving the natural language response from the customer (block 212), the intelligent customer dialogue application 145/160 may require additional information from the customer in order to interpret the intention of the received customer response (block 212). In these scenarios, the intelligent customer dialogue application 145/160 may formulate and pose or present, using natural language, an additional question via the dialogue interface 168 (block 215c) to obtain the additional information from the customer. The intelligent customer dialogue application 145/160 may utilize the intelligent dialogue machine learning model 158 to determine the additional question, in embodiments.

For example, the additional question may redirect the context of the dialogue between the intelligent customer dialogue application 145/160 and the customer. For instance, if the customer response (block 212), is "No, I don't want to see a video on the beauty product, but I would like to add an item to my order," the additional question presented by the intelligent customer dialogue application 145/160 may be "What is the item you would like to add?" or "Would you like to contact your order fulfillment agent to add the item?" In another example, the additional question may clarify, refine, and/or narrow the context of the dialogue between the intelligent customer dialogue application 145/160 and the customer. For instance, if the customer response (block 212) is "I'd like to get a user's manual for product Z," the additional question presented by the intelligent customer dialogue application 145/160 may be "Would you like us to email the user's manual to you or receive a text with a link to user's manual?" In yet another example, the additional question may augment the context of the dialogue between the intelligent customer dialogue application 145/160 and the customer. For instance, if the customer response (block 212) is "I'd like to add a package of diapers to my order," the additional question presented by the intelligent customer dialogue application 145/160 may be "Do you need any baby wipes as well?" The customer may provide a response to the additional question, and the method may return to block 212 to process the response to the additional question. In this manner, the intelligent customer dialogue application 145/160 and the customer may engage in a dialogue via the dialogue interface 168 while the customer is waiting for his or her order to be delivered. Importantly, the intelligent customer dialogue application 145/160 may provide additional, useful contextual information to the customer and/or other services to the customer, as well as maintaining the engagement of the customer with the enterprise.

In some embodiments (not shown in FIG. 2), the method 200 also includes presenting a current status of the fulfillment of the order at the dialogue interface 168 in conjunction with presenting the initial question pertaining to the context or one or more particular items of the order (block 208) and any subsequent responses, replies, and/or questions included in the dialogue between the customer and the intelligent customer dialogue application 145/160. The method 200 may update the current status of the order fulfillment as the order fulfillment progresses (e.g., order received, payment processing, order being filled, item out of stock, item substituted or missing, estimated time until delivery, etc.), and the method 200 may allow for the customer and/or the system 100 to ask each other questions and/or provide information specifically pertaining to fulfilling and/or picking up the order, e.g., "I'd like to add/remove/replace an item," "I'll be back in 15 minutes to pick up the order," "What parking space are you in", "Would you like a printed receipt", to name a few.

However, in addition to or other than asking specific questions and/or providing information specifically pertaining to fulfilling and/or picking up the order, the intelligent customer dialogue application 145/160 automatically and contextually dialogues with the customer (e.g., via the dialogue interface 168) to advantageously provide more contextual, value-add information and/or services to the customer while the customer is waiting for their order to be delivered. That is, the intelligent customer dialogue systems and techniques discussed herein are not directed to mere order fulfillment status. Instead, by leveraging a particular ordered item and contextual question as an initial entry into a dialogue with the customer, the intelligent customer dialogue systems and techniques are able to intelligently expand the dialogue with the customer to provide other relevant services and information while the customer is waiting for the order. Indeed, as the systems and techniques discussed herein may use a specially trained machine learning model (e.g., as is discussed in more detail with respect to FIG. 3), the intelligent customer dialogue system may offer contextual information which is more relevant to and/or requested by the customer than customer interfaces which only provide a pre-determined set of system responses. That is, the intelligent dialogue system 100 does not simply utilize canned responses and/or a discrete, pre-determined decision tree to provide rote responses to the customer, but automatically and contextually refines, augments, and/or redirects the natural language dialogue with the customer to provide value-add information and/or additional services which are customized to the customer. For example, the intelligent customer dialogue application 145/160 may automatically provide answers and/or services to customer questions such as "I'd like to have a consultation with the pharmacist/beauty consultant/health advisor," "I'd like more information about product X or service Y," "Do you sell product Z", "I'd like recommendations on types of product W", etc. Accordingly, the intelligent customer dialogue systems and techniques described herein allow the customer to obtain customer-directed information and/or services in addition to and/or other than those directly related to the fulfillment of the particular order, thereby resulting in more effective customer service and continued customer engagement.

In some embodiments (not shown in FIG. 2), the method 200 additionally includes presenting, at the dialog interface 168, purchasing opportunities related to items other than those included in the order. For example, the intelligent customer dialogue application 145/160 may suggest products which are related to items in the order, may suggest products based on current conditions and/or events proximate to the location 102 (e.g., weather, sports events, etc.), may provide information on current store promotions, may offer coupons on other items which the customer has previously purchased or electronically viewed, etc.

Figure 3:
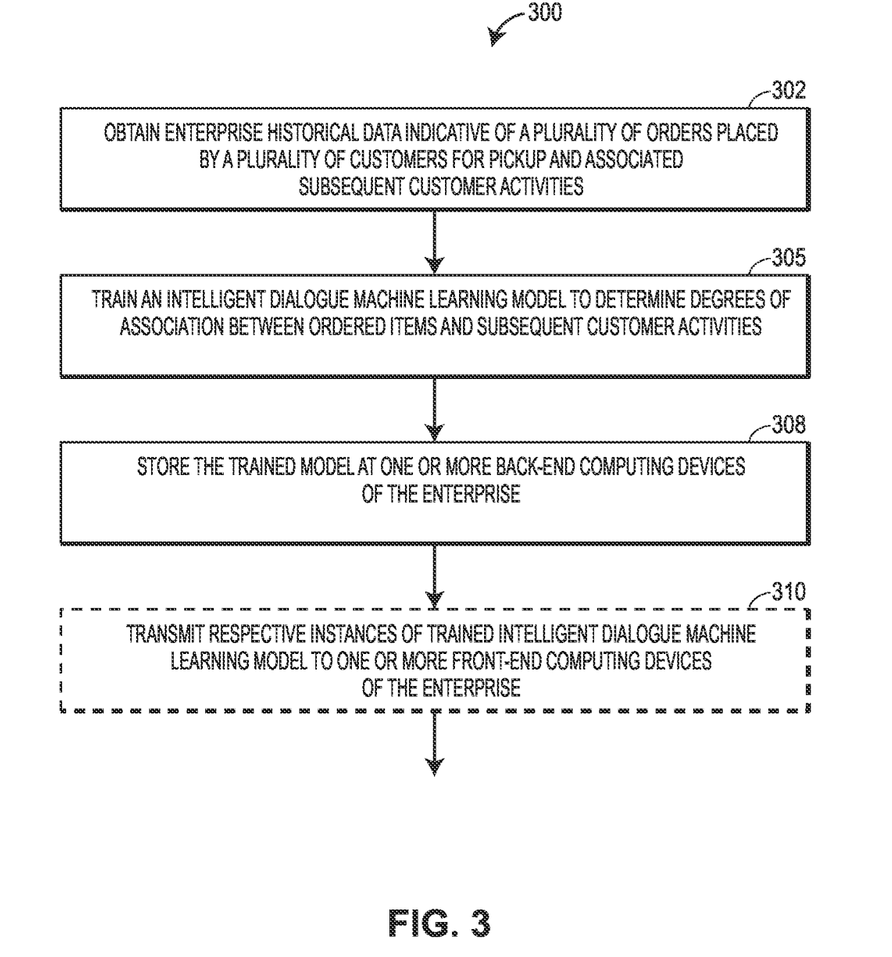
FIG. 3 depicts a flow chart of an example method for creating, generating, or updating an intelligent dialogue machine learning model.

FIG. 3 depicts a flow chart of an example method 300 for creating or generating an intelligent dialogue machine learning model, such as the intelligent dialogue machine learning model 158 of FIG. 1. The method 300 may operate in conjunction with embodiments of at least portions of the system 100 of FIG. 1 and/or other systems, processors, databases, and/or devices. For example, the model trainer 148 of the system 100 may perform at least a portion of the method 300. For ease of discussion herein, and not for limitation purposes, the method 300 is discussed with simultaneous reference to FIG. 1. Additionally, in some embodiments, the method 300 may execute in conjunction with embodiments of the method 200 of FIG. 2. For example, the method 300 may execute prior to executing the method 200, e.g., to initially generate and train the intelligent dialogue machine learning model 158, and/or the method 300 may be executed after executing the method 200, e.g., to retrain or update the intelligent dialogue machine learning model 158. Further, the method 300 may include additional or alternate steps other than those described with respect to FIG. 3, in embodiments.

At a block 302, the method 300 includes obtaining historical data related to the enterprise. The historical data may include historical data indicative of various aspects and/or characteristics of a plurality of orders placed by a plurality of customers with the enterprise for pickup, such as the items included in the orders, customer activities related to the orders and/or to the items in the orders (e.g., interactions of customers with the enterprise via various contact and/or communication channels) at various stages of order fulfillment and after orders have been picked up, enterprise activities related to the orders and/or to the items in the orders at various stages of order fulfillment, enterprise locations (e.g., electronic or physical) at which orders were placed and/or were picked up, profile data corresponding to the plurality of customers, etc. Additionally, the historical data may include other information corresponding to the times and locations at which the orders were placed and/or picked up, such as seasonality information (e.g., holidays, back-to-school, month of the year, etc.), current store promotions, external events or conditions (e.g., major sporting events in the vicinity of the location, convention or conference being held in proximity to the location etc.), time of day, weather, etc. In an embodiment, obtaining the historical data (block 302) may include obtaining or accessing the historical data 165 stored in the data stores 155.

In some implementations, obtaining the historical data (block 302) may include obtaining a subset of an entirety of the stored historical data 165. For example, an entirety of the historical data 165 stored in the back-end data store 155 of the system 100 may be filtered based on a particular customer, a particular location within the enterprise, a particular product or products, a particular season/date/time of year, combinations thereof, etc.

At a block 305, the method 300 includes training an intelligent dialogue machine learning model (such as intelligent dialogue machine learning model 158, which may be implemented as one or more machine-learning models) on the obtained historical data to determine degrees of association between various ordered items and one or more subsequent customer activities. Generally speaking, at the block 305, one or more machine-learning techniques (e.g., clustering, regression, neural networks, etc.) may be applied to the obtained historical data to determine respective probabilities of occurrence of various subsequent customer activities (e.g., a customer activity occurring after the item has been ordered) for each ordered item, e.g., individually, in combination with other items included its order, and/or with the order as a whole.

Accordingly, the intelligent dialogue machine learning model may be trained to specifically determine, for each ordered item (and optionally for each combination and/or sub-combination of ordered items included in each order and/or for each order as a whole), one or more subsequent customer activities which are the mostly likely to occur. Said another way, the intelligent dialogue machine learning model may be trained to determine one or more subsequent customer activities which have higher respective degrees of association or occurrence with each ordered item (and optionally each combination of ordered items and/or each order as a whole) than other subsequent customer activities indicated in the historical data. That is, the determined subsequent customer activit(ies) may have respective degrees of association above a threshold, where the threshold may be pre-determined and may be adjustable. In some implementations, the intelligent dialogue machine learning model may be trained to determine probabilities and/or degrees of association between ordered items and subsequent customer activities based on additional information or parameters related to the customer, the order, and/or the pickup location. For example, the additional information based on which the model may be trained may include locations at which orders were placed; locations at which orders were picked up; time of day, day of week, day of month or year, and/or other seasonal information; enterprise promotions in effect; location-based promotions in effect; lengths of time elapsing between order placement and subsequent customer activities; order fulfillment status; customer preferences, demographics, transaction history, and/or other customer-related information; weather; external events; and the like. Training the model (block 305) may include tuning and/or determining respective weights of various input parameters of the intelligent dialogue machine learning model 158, for example.

Creating and/or training the intelligent dialogue machine learning model (block 305) may include utilizing supervised and/or unsupervised machine learning techniques. For example, to create an initial intelligent machine learning model, supervised machine learning techniques may be applied to a training data set that has been pre-populated with data corresponding to different types of ordered items, combinations of items within orders, customer demographics, customer histories with the enterprise, other types of customer profile data, seasonal data, promotions, and/or other types of data corresponding to customer orders. Experimentation may be performed to determine an initial set of probabilities of occurrences (e.g., degrees of association) between various ordered items (and optionally various combinations of items within an order) and various subsequent customer activities.

The initially-generated intelligent dialogue machine learning model may be subsequently trained (e.g., in a supervised and/or non-supervised manner) on additional data which has been logged or collected and is indicative of actual subsequent customer activities corresponding to actual ordered items. For example, the intelligent customer dialogue application 145/160 may capture the content of the dialogue between the customer and the intelligent customer dialogue application 145/160 held at the dialogue interface 168, and may store the captured content as additional historical data 165. The initially-generated intelligent dialogue machine learning model may be re-trained on the updated historical data 165 to generate an updated intelligent dialogue machine learning model. Thus, as the historical data set 165 is updated with data indicative of the intelligent dialogues of numerous customers over time, the intelligent dialogue machine learning model may be correspondingly re-trained and updated based on actual, collected historical order and dialogue data.

At a block 308, the method 300 includes storing the trained intelligent dialogue machine learning model at one or more back-end computing devices of the enterprise. For example, the trained intelligent dialogue machine learning model 158 may be stored within the back-end components 125 of the system 100, e.g., within a data store 155.

At an optional block 310, the method 300 includes transmitting respective instances of the trained intelligent dialogue machine learning model 158 to one or more front-end computing devices 103, 105a, 105b of the enterprise. For example, instances of the trained intelligent dialogue machine learning model 158 may be transmitted (e.g., pushed and/or pulled) to a local computing devices 103 associated with a particular physical storefront location 102 for local storage and access by the instances 160 of the intelligent customer dialogue application 145 executing at various customer-facing local computing devices 105a, 105b at the location 102. Additionally or alternatively, a customer-facing local computing device 105a, 105b at the specific physical location 102 may store an instance of the trained intelligent dialogue machine learning model 158 in conjunction with an instance 160 of the intelligent customer dialogue application 145 for use in initiating, generating, and maintaining an intelligent dialogue with a customer via a dialogue 168 interface at the customer-facing local computing device 105a, 105b.

In some arrangements, the block 310 may be omitted for one or more local computing devices 103, 105a, 105b. For example, rather than locally storing or accessing an instance of the trained intelligent dialogue machine learning model 158 at the location 102, a local computing device 103, 105a, 105b may remotely access the intelligent dialogue machine learning model 158 stored at the back-end components 125, e.g., via the network(s) 135 as/when needed. For example, the instance 160 of the intelligent customer dialogue application 145 at the customer-facing local computing device 105a, 105b may remotely access the intelligent dialogue machine learning model 158 at the back-end servers 132 (e.g., via the intelligent dialogue module 142, in some implementations) to perform any one or more portions of the methods 200, 300. In another example, an instance 160 of the intelligent customer dialogue application 145 executing at a customer PED 115 may remotely access the intelligent dialogue machine learning model 158 (e.g., via the intelligent dialogue module 142, in some implementations) to perform any one or more portions of the methods 200, 300.

Thus, in view of the above, the novel systems, methods, and techniques disclosed herein are able to provide benefits and advantages which are not able to be provided by known techniques. Indeed, rather than simply utilizing canned responses and/or a discrete, pre-determined decision tree to provide rote responses to the customer as is currently done by known techniques, the novel systems, methods, and techniques described herein leverage a particular ordered item and contextual question related to the ordered item as an initial entry into a dialogue with the customer upon detecting that the customer has arrived at a location to pick up a previously-placed order. Moreover, while the customer is waiting for their order to be delivered, the novel systems, methods, and techniques are able to intelligently expand the dialogue with the customer to provide other relevant services and information in addition to and/or other than those directly related to the fulfillment of the particular order, thereby resulting in more effective customer service and continued customer engagement.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

Further, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A method, comprising: receiving, by a computing system of an enterprise, an electronic signal indicative of an arrival of a customer at a location of the enterprise to pick up an order; and in response to receiving the electronic signal:

generating, by the enterprise computing system at a user interface of a customer-facing computing device located at the enterprise location, a dialogue interface via which the customer and an intelligent customer dialogue application dialogue using natural language;

determining, by the intelligent customer dialogue application, an initial question pertaining to a context of a particular item of the order; and posing, by the intelligent customer dialogue application, the initial question at the dialogue interface using natural language.

2. The method of the preceding aspect, further comprising determining, by the intelligent customer dialogue application, a current status of a fulfillment of the order, and wherein determining the initial question for the customer is further based on the current status of the order fulfillment.

3. The method of any one of the preceding aspects, wherein determining the initial question regarding the context of the particular item of the order is further based information included in an account of the customer stored at the enterprise computing system.

4. The method of any one of the preceding aspects, further comprising presenting a current status of a fulfillment of the order at the dialogue interface, and dynamically updating the current status in accordance with the fulfillment of the order.

5. The method of any one of the preceding aspects, wherein posing the initial question at the dialogue interface using natural language includes posing the initial question at the dialogue interface using natural language of at least one of a visual format or an auditory format.

6. The method of any one of the preceding aspects, wherein receiving the electronic signal indicative of the arrival of the customer at the enterprise location comprises at least one of: receiving a wireless signal generated by a mobile device operated by the customer; receiving the electronic signal via at least one of a stationary computing device of the enterprise fixedly disposed at the enterprise location or a mobile computing device of the enterprise disposed at the enterprise location; or detecting, via one or more sensors disposed at the enterprise location, a presence of the customer at the enterprise location.

7. The method of any one of the preceding aspects, wherein generating the dialogue interface at the customer-facing computing device includes generating the dialogue interface at one of: a mobile device operated by the customer, a stationary computing device of the enterprise fixedly disposed at the enterprise location, or a mobile computing device of the enterprise disposed at the enterprise location.

8. The method of the preceding aspect, wherein the mobile computing device of the enterprise is a drone or a robot.

9. The method of any one of the preceding aspects, wherein the method further comprises: receiving, via the dialogue interface by the intelligent customer dialogue application, a natural language response to the initial question; and based on a content of the natural language response to the initial question, at least one of:

(i) obtaining, by the intelligent customer dialogue application, information corresponding to a content of the natural language response, and presenting the obtained information at the dialogue interface;

(ii) determining, by the intelligent customer dialogue application, a second question, and presenting the second question at the dialogue interface using natural language; or (iii) determining, by the intelligent customer dialogue application, an action to be performed in conjunction with an enterprise computing device, and initiating the action.

10. The method of the preceding aspect, wherein presenting the obtained information at the dialogue interface comprises presenting a video, an article, or other information related to an item included in the order at the dialogue interface.

11. The method of any one of aspects 9-10, wherein determining the second question comprises determining a second question which redirects from, clarifies, or augments the natural language response to the initial question.

12. The method of any one of aspects 9-11, wherein: the enterprise computing device is operated by an agent of the enterprise; and initiating the action includes sending, by the intelligent customer dialogue application, a communication to the enterprise computing device, the communication including at least one of an instruction corresponding to the order or information provided by the customer in the natural language response.

13. The method of any one of aspects 9-12, wherein: the customer-facing computing device located at the enterprise location is a first customer-facing computing device; the enterprise computing device is operated by an agent of the enterprise; and initiating the action includes establishing, by the intelligent customer dialogue application, a communicative connection between the agent computing device and the first customer-facing computing device or a second customer-facing computing device associated with the customer, thereby enabling the customer and the agent to communicate via the established communication channel.

14. The method of any one of aspects 9-13, wherein determining the action to be performed in conjunction with the enterprise computing device includes determining an action to be performed by an agent of the enterprise via the enterprise computing device, the agent being one of a pharmacist or a person fulfilling the order.

15. The method of any one of the preceding aspects, wherein determining the initial question regarding the context of the particular item of the order comprises: applying a machine learning model to the order to thereby generate an output, the machine learning model trained based on a machine analysis of historical data indicative of orders placed by customers for pickup, items included in the orders, and subsequent customer activities related to the orders to determine one or more subsequent customer activities that have respective higher degrees of association to individual ordered items, combinations of ordered items, and/or to orders as a whole than respective degrees of association of other subsequent customer activities; and generating the initial question based on the output of the machine learning model.

16. The method of the preceding aspect, further comprising: updating the historical data to include data indicative of the order and a content of the dialogue interface; and re-training the machine learning model using the updated historical data.

17. A computing system of an enterprise, the computing system comprising: one or more processors; one or more tangible memories storing an order placed by the customer with the enterprise and information included in an account of a customer with the enterprise; one or more communication interfaces via which the computing system obtains an electronic signal indicative of an arrival of the customer at a location of the enterprise to pick up the order; and an intelligent customer dialogue application stored on the one or more memories and executable by the one or more processors to, in response to the received electronic signal: generate, at a user interface of a customer-facing computing device located at the enterprise location, a dialogue interface enabling the intelligent customer dialogue application and the customer to dialogue using natural language; determine an initial question pertaining to a context of a particular item of the order; and pose the initial question at the dialogue interface using natural language.

18. The computing system of aspect 17, further comprising a machine learning model stored on the one or more memories, the machine learning model trained based on a machine analysis of historical data indicative of orders placed by customers for pickup, items included in the orders, and subsequent customer activities related to the orders to determine one or more subsequent customer activities that have respective higher degrees of association to individual ordered items, to combinations of ordered items, and/or to orders as a whole than respective degrees of association of other subsequent customer activities; and wherein the intelligent customer dialogue application determines the initial question by applying the machine learning model to the order placed by the customer.

19. The computing system of aspect 18, wherein: the historical data based on which the machine learning model is trained further includes statuses of fulfillments of the orders; and the intelligent customer dialogue application determines the initial question by applying the machine learning model to the order placed by the customer and a current status of fulfilment of the order placed by the customer.

20. The computing system of any one of aspects 17-19, wherein the intelligent customer dialogue application is executable by the one or more processors further to, based on a content of a natural language response to the initial question received at the dialogue interface, at least one of:

obtain information corresponding to the content of the natural language response, and present the obtained information at the dialogue interface, the obtained information including at least one of a video pertaining to the particular item or additional information about the particular item;

determine a second question and present the second question at the dialogue interface using natural language, the second question clarifying the natural language response, augmenting the natural language response, and/or redirecting the dialogue between the intelligent customer dialogue application and the customer based on the natural language response; or determine an action to be performed in conjunction with an enterprise computing device, and initiate the action.

21. The computing system of the preceding aspect, wherein the action includes establishing a one-way or a two-way communication channel between the customer-facing computing device or another customer-facing computing device and the enterprise computing device, and the enterprise computing device is operated by a pharmacist, a person fulfilling the order, or another agent of the enterprise.

22. Any one of the preceding aspects in combination with any other one of the preceding aspects.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method, comprising:
applying, by a computing system of an enterprise, a machine learning model to an order of a customer of the enterprise to thereby generate an output, the machine learning model trained based on a machine analysis of historical data indicative of orders placed by customers, items included in the orders, and subsequent customer activities related to the orders to determine one or more subsequent customer activities that have respective higher degrees of association to individual ordered items, combinations of ordered items, and/or to orders as a whole than respective degrees of association of other subsequent customer activities, and the output being indicative of a particular item, from items included in the order, that has a respective higher degree of association with at least one subsequent customer activity than respective degrees of association of at least one other item included in the items included in the order with the at least one subsequent customer activity;

posing, by the computing system on a user interface associated with the customer, an initial question pertaining to a context of the particular item of the order indicated by the output of the machine learning model, the context corresponding to providing additional information related to the particular item, and the additional information excluding any information corresponding to a fulfillment of the order; and responsive to receiving a response to the initial question, at least one of:

(i) obtaining, by the computing system, information corresponding to the response and presenting the obtained information at the user interface;

(ii) determining, by the computing system and based on a content of the response, a second question and presenting the question at the user interface; or (iii) determining, by the computing system, an action to be performed in conjunction with a computing device of the enterprise and initiating the action.

2. The method of claim 1, further comprising determining the initial question pertaining to the context of the particular item of the order based on information that is included in an account of the customer and that is stored at the computing system of the enterprise.

3. The method of claim 1, further comprising receiving an electronic signal indicative of a presence of the customer at the enterprise, and wherein at least one of the applying of the machine learning model or the posing of the initial question is responsive to the receiving of the electronic signal.

4. The method of claim 1, wherein the user interface is included in a mobile device operated by the customer, a stationary computing device of the enterprise fixedly disposed at an enterprise location, or a mobile computing device of the enterprise disposed at the enterprise location.

5. The method of claim 4, wherein the mobile computing device of the enterprise is a drone or a robot.

6. The method of claim 1, wherein the presenting of the obtained information at the user interface comprises presenting a video, an article, or other information related to the particular item or to another item included in the order.

7. The method of claim 1, wherein the response to the initial question is a natural language response, and the determining of the second question comprises determining a second question which redirects from, clarifies, or augments the natural language response.

8. The method of claim 1, wherein the initiating of the action to be performed in conjunction with the computing device of the enterprise includes sending, to the computing device of the enterprise, at least one of an instruction corresponding to the order or information provided by the customer.

9. The method of claim 1, wherein the initiating of the action to be performed in conjunction with the computing device of the enterprise includes establishing a communicative connection between the computing device of the enterprise and another computing device on which the user interface is included, thereby enabling the customer and an agent operating the computing device of the enterprise to communicate via the established communicative connection.

10. The method of claim 1, wherein the output of the machine learning model is further indicative of the at least one subsequent customer activity, and the additional information is based on the at least one subsequent customer activity.

11. The method of claim 1, further comprising:

updating the historical data to include data indicative of the order and a content presented on the user interface and corresponding to the order; and re-training the machine learning model using the updated historical data.

12. The method of claim 1, further comprising presenting a current status of the fulfillment of the order on the user interface, and dynamically updating the current status in accordance with the fulfillment of the order.

13. A system of an enterprise, the system comprising:

one or more processors;

one or more memories storing an indication of an order placed by a customer of the enterprise;

a machine learning model stored on the one or more memories and trained based on a machine analysis of historical data indicative of orders placed by customers for pickup, items included in the orders, and subsequent customer activities related to the orders to determine one or more subsequent customer activities that have respective higher degrees of association to individual ordered items, combinations of ordered items, and/or to orders as a whole than respective degrees of association of other subsequent customer activities; and an intelligent customer dialogue application stored on the one or more memories and executable by the one or more processors to:

apply the machine learning model to the order of the customer to thereby generate an output, the output being indicative of a particular item, from items included in the order, that has a respective higher degree of association with at least one subsequent customer activity than respective degrees of association of at least one other item included in the items included in the order with the at least one subsequent customer activity;

pose, on a user interface associated with the customer, an initial question pertaining to a context of the particular item of the order indicated by the output of the machine learning model, the context corresponding to providing additional information related to the particular item, and the additional information excluding any information corresponding to a fulfillment of the order; and responsive to a reception of a response to the initial question, at least one of:

(i) obtain information corresponding to the response and present the obtained information at the user interface;

(ii) determine, based on a content of the response, a second question and present the question at the user interface; or (iii) determine an action to be performed in conjunction with a computing device of the enterprise and initiate the action.

14. The system of claim 13, wherein the intelligent customer dialogue application is further executable to determine the initial question based on the application of the machine learning model to the order.

15. The system of claim 13, wherein the computing device of the enterprise is a first computing device operated by an agent of the enterprise, and the action includes an establishment of a communication channel between a second computing device on which the user interface is included and the first computing device, thereby enabling the customer and the agent to communicate via the established communication channel.

16. The system of claim 13, wherein the computing device of the enterprise is operated by an agent of the enterprise, and the action includes a transmission, to the computing device of the enterprise, of at least one of: information provided by the customer, or an instruction for the agent and corresponding to the order.

17. The system of claim 13, wherein the presentation of the obtained information includes a presentation of a video, article, or other information related to the particular item or another item included in the order.

18. The system of claim 13, wherein the response to the initial question is a natural language response.

19. The system of claim 18, wherein the natural language response is in at least one of a visual format or an auditory format.

20. The system of claim 18, wherein the second question redirects, clarifies, or augments the natural language response.

\* \* \* \* \*